(12) United States Patent
Weatherill et al.

(10) Patent No.: US 11,874,227 B2
(45) Date of Patent: Jan. 16, 2024

(54) METHOD AND APPARATUS FOR TERAHERTZ OR MICROWAVE IMAGING (71) Applicant: The University of Durham, Durham (GB)

(72) Inventors: Kevin Weatherill, Durham (GB); Charles Adams, Durham (GB)

(73) Assignee: The University of Durham, Durham (GB)

( * ) Notice: Subject to any disclaimer, the term of this patent is extended or adjusted under 35 U.S.C. 154(b) by 0 days.

(21) Appl. No.: 17/281,798

(22) PCT Filed: Sep. 23, 2019

(86) PCT No.: PCT/GB2019/052663
§ 371 (c)(1),
(2) Date: Mar. 31, 2021

(87) PCT Pub. No.: WO2020/070470
PCT Pub. Date: Apr. 9, 2020

(65) Prior Publication Data
US 2021/0389248 A1 Dec. 16, 2021

(30) Foreign Application Priority Data

Oct. 4, 2018 (GB) ..................... 1816205

(51) Int. Cl.
*G01N 21/64* (2006.01)
*G01N 22/00* (2006.01)
(52) U.S. Cl.
CPC ......... *G01N 21/6458* (2013.01); *G01N 22/00* (2013.01)
(58) Field of Classification Search
CPC . G01N 21/6458; G01N 22/00; G01N 21/3581
See application file for complete search history.

(56) References Cited

U.S. PATENT DOCUMENTS

| 4,293,769 | A | 10/1981 | Kleppner | |
| 6,977,379 | B2 * | 12/2005 | Zhang | G01N 21/3581 |
| | | | | 250/341.1 |

(Continued)

FOREIGN PATENT DOCUMENTS

| CN | 103644970 A | 3/2014 |
| CN | 107917892 A | 4/2018 |

OTHER PUBLICATIONS

EPO Patent Translate of CN107917892A, 2018.*

(Continued)

*Primary Examiner* — David P Porta
*Assistant Examiner* — Djura Malevic
(74) *Attorney, Agent, or Firm* — Quarles & Brady LLP (57) ABSTRACT

An apparatus and method for imaging using microwave or terahertz radiation are described. The apparatus comprises: a cell comprising a vapour of atoms; one or more laser beams propagating through said cell, said one or more laser beams defining a sensing region in said cell; an imaging beam for illuminating an object receiving area for receiving an object to be imaged, said imaging beam comprising microwave or terahertz radiation; an imaging system for focusing the imaging beam to form, in use, an image of said object at said sensing region in said cell; wherein respective frequencies of said one or more laser beams and said imaging beam are such that at least some of said atoms, when subjected to radiation of both said one or more laser beams and said imaging beam, are excited to a final excited state which decays to a lower energy state by emission of optical fluorescence.

19 Claims, 4 Drawing Sheets

(56) References Cited

U.S. PATENT DOCUMENTS

| | | | |
|---|---|---|---|
| 2004/0155665 A1 | 8/2004 | Arnone et al. | |
| 2005/0156110 A1 | 7/2005 | Crawely | |
| 2008/0156991 A1 | 7/2008 | Hu et al. | |
| 2008/0277567 A1* | 11/2008 | Doran | G01N 21/4795 250/227.2 |
| 2011/0001052 A1* | 1/2011 | Struye | G01T 1/2016 250/369 |
| 2011/0031414 A1* | 2/2011 | Lippert | G02B 21/16 250/459.1 |
| 2011/0122488 A1* | 5/2011 | Truong | G02B 21/16 359/385 |
| 2011/0134521 A1* | 6/2011 | Truong | G02B 21/002 359/388 |
| 2012/0293797 A1* | 11/2012 | Braeckmans | G01N 21/05 356/246 |
| 2015/0048824 A1 | 2/2015 | Bohi et al. | |
| 2016/0327779 A1* | 11/2016 | Hillman | G02B 21/361 |
| 2017/0261739 A1* | 9/2017 | Juffmann | G02B 17/08 |
| 2020/0355983 A1* | 11/2020 | Lipson | G02B 6/12033 |
| 2022/0003604 A1* | 1/2022 | Iglev | G02B 21/365 |

OTHER PUBLICATIONS

Downes et al., Full-Field, Room-Temperature Terahertz Imaging at Kilohertz Frame Rates using Atomic Vapour, In The European Conference on Lasers and Electro-Optics, 2019, 1 page.

Downes et al., High-Speed THz Imaging for Production Line Monitoring, In 2019 44th International Conference on Infrared, Millimeter, and Terahertz Waves (IRMMW-THz), pp. 1-2.

Downes et al., Ultra-High-Speed Terahertz Imaging Using Atomic Vapour, arXiv:1903.01308, Mar. 15, 2019, 9 pages.

Vogl et al., Collisional Redistribution Laser Cooling of a High-Pressure Atomic Gas, Journal of Modern Optics, 2011, 58(15):1300-1309.

Wade et al., Real-Time Near-Field Terahertz Imaging with Atomic Optical Fluorescence, arXiv:1603.07107, Mar. 23, 2016, 5 pages.

Wade et al., Real-Time Near-Field Terahertz Imaging with Atomic Optical Fluorescence, Nature Photonics, 2017, 11 (1):40-43.

Wade et al., Terahertz-Driven Phase Transition Applied as a Room-Temperature Terahertz Detector, arXiv:1709.00262, Sep. 1, 2017, 8 pages.

PCT International Search Report and Written Opinion, PCT/GB2019/052663, dated Nov. 21, 2019, 18 pages.

\* cited by examiner

METHOD AND APPARATUS FOR TERAHERTZ OR MICROWAVE IMAGING

CROSS REFERENCE TO RELATED APPLICATIONS

This application represents the U.S. national stage entry of International Application No. PCT/GB2019/052663 filed Sep. 23, 2019, which claims priority to United Kingdom Patent Application No. 1816205.7 filed Oct. 4, 2018, the disclosures of which are incorporated herein by reference in their entirety and for all purposes.

FIELD OF THE INVENTION

The present invention relates to a method and apparatus for terahertz or microwave imaging, in particular, but not exclusively, to a method for terahertz or microwave imaging using atoms in a light sheet to convert radiation from a terahertz or microwave imaging beam to visible light.

BACKGROUND

Terahertz (THz) technologies, generally defined as operating in the 0.3 to 10 THz range, bridge the gap between electronic and photonic devices. Because THz waves are a non-ionising radiation that passes readily through everyday materials such as plastics, paper and cloth, they are suitable for use in security and biomedical applications as well as in telecommunications and industrial non-destructive testing (NDT). For all these applications, it is desirable to have highly sensitive detectors which are able to operate at high speeds.

A wide range of THz imaging systems are available. Cryogenically cooled devices, such as micro-bolometer arrays, allow video-rate imaging with high sensitivity but low portability and high system cost. Room-temperature rastered point detectors allow phase-sensitive near field imaging, but at slower imaging speeds. However, a fast, sensitive THz sensor operating close to room temperature has proved elusive.

Embodiments of the present invention seek to overcome at least one disadvantage of the prior art.

STATEMENTS OF INVENTION

According to a first aspect of the invention, there is provided an apparatus for imaging using microwave or terahertz radiation, said apparatus comprising:
a cell comprising a vapour of atoms;
one or more laser beams propagating through said cell, said one or more laser beams defining a sensing region in said cell;
an imaging beam for illuminating an object receiving area for receiving an object to be imaged, said imaging beam comprising microwave or terahertz radiation;
an imaging system for focusing the imaging beam to form, in use, an image of said object at said sensing region in said cell;
wherein respective frequencies of said one or more laser beams and said imaging beam are such that said atoms, when subjected to radiation of both said one or more laser beams and said imaging beam, are excited to a final excited state which decays to a lower energy state by emission of optical fluorescence.

Advantageously, the present invention may be used for imaging microwave (typically, 300 MHz to 300 GHz) or terahertz (typically, 0.3 THz to 10 THz) radiation fields using an atomic vapour to perform microwave/terahertz-to-optical conversion. Atoms in the sensing region may effectively act as a sensor, emitting optical fluorescence when irradiated by radiation from the imaging beam and laser beams. The optical fluorescence may, for example, be viewed by a user or recorded using an image sensor, e.g. a camera. In particular, the present invention may enable microwave or terahertz radiation fields to be imaged using the apparatus operating at or close to room temperature. Furthermore, the present invention may enable microwave or terahertz radiation fields to be imaged at high speed, limited only by the lifetime of the final excited state, which may, for example, be on the order of microseconds. This is different from known terahertz imaging techniques based on non-linear terahertz-to-optical conversion in crystalline materials and metamaterials, which rely on high-intensity terahertz fields to obtain useable conversion efficiencies and are therefore only suitable for use with pulsed terahertz fields, the pulse duty cycle limiting the device sensitivity. In contrast, the present invention exploits the high polarizability of excited atomic states, which gives rise to strong interactions with resonant terahertz fields and enables use of a continuous-wave terahertz source for the imaging beam. In addition, the atomic resonances are typically narrow, thereby reducing black-body induced fluorescence and improving sensitivity.

The apparatus may further comprise a camera for imaging said optical fluorescence emitted by said atoms.

The apparatus may further comprise a spectral filtering device for filtering said optical fluorescence emitted by said atoms.

This may be useful in improving the spatial resolution of the apparatus.

In some embodiments, at least one of said one or more laser beams is arranged as a light sheet defining said sensing region in said cell.

By arranging at least one of said one or more laser beams as a light sheet, a 2D image of the microwave or terahertz radiation may be obtained. The light sheet may be arranged substantially orthogonal to the incident imaging beam.

Said light sheet may have a thickness of less than the wavelength of the microwave or terahertz radiation of the imaging beam.

The apparatus may be configured for rastering said light sheet through at least a portion of said sensing region.

By rastering (or scanning) the light sheet through at least a portion of the sensing region, multiple 2D images may be obtained for reconstruction into a three-dimensional image.

The image at said sensing region in said cell may be a three-dimensional image.

For example, a three-dimensional image of a three-dimensional object may be formed in a three-dimensional sensing region defined by the laser beams. In such embodiments, the laser beams illuminate a sensing region having a cross-sectional area extending along both axes perpendicular to a direction of propagation of the laser beams.

In some embodiments, said sensing region and said object receiving area are located at conjugate image planes of said imaging system.

The imaging beam may be collimated for illuminating said object receiving area.

The image of said object may be formed by a portion of said imaging beam transmitted or reflected by said object.

By reflecting the imaging beam from the object, the apparatus may be more compact.

In some embodiments, this may be achieved using one or more PTFE lenses and/or one or more parabolic metal mirrors.

In some embodiments, said one or more laser beams comprises a plurality of coaxial laser beams.

In some embodiments, at least two of said plurality of coaxial laser beams propagate in opposite directions.

Advantageously, this may help to reduce blurring of the images, due to motion of the atoms in the time between excitation and decay, using Doppler selection to suppress excitation of the fast-moving atoms.

The apparatus may further comprise an optical cavity arranged around the cell to enhance the field strength of at least one of said one or more laser beams.

Since the maximum achievable size of the sensing region may be limited by the available laser power of at least one of said one or more laser beams, an optical cavity may be used to achieve a larger sensing region for a given laser power. Also, by reflecting at least one of said one or more laser beams back on itself, the optical cavity may partially compensate absorption effects (Beer's law) of the laser beams, which might affect uniformity of brightness of the optical fluorescence across the sensing region.

The frequency of said imaging beam may correspond to a transition between an initial excited state of said atoms and said final excited state.

That is, the frequency of the imaging beam may be resonant with or detuned from said transition between the initial excited state and the final excited state.

The respective frequencies of said one or more laser beams may correspond to one or more respective steps of a single-step or multi-step excitation process between a ground state of said atoms and said initial excited state.

That is, the frequencies of said one or more laser beams be resonant with or detuned from one or more respective steps of a single-step or multi-step excitation process between a ground state of said atoms and said initial excited state. In particular, the frequency of one of said one or more laser beams corresponding to a final step of said single-step or multi-step excitation process may be resonant with or detuned from a transition between a ground or intermediate state of the atoms and said initial excited state.

That is, in some embodiments, a single laser beam may be used to excite atoms from the ground state of the atoms to or via the initial excited state. In other embodiments, multiple laser beams may be used to excite atoms to or via the initial excited state in a series of steps, each step being driven by a respective laser beam.

The respective frequencies of said one or more laser beams may be such that at least some of said atoms, when subjected to radiation of said one or more laser beams, are excited to said initial excited state.

As a result, the sensing region, defined by the one or more laser beams, may correspond to a region in which atoms are prepared in the initial excited state, thereby able to interact with radiation of the imaging beam to produce optical fluorescence.

In some embodiments, a laser beam of said one or more laser beams, corresponding to a final step of said single-step or multi-step excitation process, is detuned from a transition between a ground or intermediate state of the atoms and the initial excited state by a first frequency detuning, and said imaging beam is detuned from the transition between the initial excited state and final excited state by a second frequency detuning having a magnitude substantially equal to that of the first frequency detuning.

This may result in a non-linear transition from a ground or intermediate state in a multi-step excitation process to the final excited state, such that atoms are not excited to the initial excited state. This may reduce or prevent optical fluorescence due to decay of atoms from the initial excited state due to excitation by the one or more laser beams alone, thereby improving image quality.

Said one or more laser beams and said imaging beam may be tuned for transferring atoms from a ground state or an intermediate state of said atoms to said final excited state via a stimulated Raman transition.

This may reduce optical fluorescence due to decay of atoms from excited states other than the final excited state, thereby improving image quality. In addition, use of an off-resonant Raman process may increase the dynamic range of the apparatus, allowing more intense radiation fields to be imaged.

Said final excited state and/or said initial excited state may be respective Rydberg states.

Said final excited state may have a principal quantum number equal to or higher than 9.

Since the strength of the transition driven by the terahertz/microwave-frequency imaging beam (e.g. the transition from the initial excited state to the final excited state) generally increases with principal quantum number (n), a final excited state having a principal quantum number equal to or higher than 9 may improve the efficiency of conversion of the microwave or terahertz radiation of the imaging beam to optical fluorescence.

Said final excited state may have a principal quantum number equal to or lower than 40.

Although the strength of the transition driven by the terahertz/microwave-frequency imaging beam (e.g. the transition from the initial excited state to the final excited state) generally increases with principal quantum number (n), the laser beam power required to excite the atoms (e.g. to the initial excited state) also increases with principal quantum number (n). Furthermore, spontaneous decay transitions from excited states with high principal quantum number (n) are closer together, making it more difficult to filter out any fluorescence not due to the microwave or terahertz radiation of the imaging beam. Accordingly, the inventors have found that the invention works better using a final excited state having a principal quantum number of 40 or lower.

Said final excited state may have a principal quantum number between 9 and 40.

The vapour may be at or above ambient temperature.

Advantageously, the present invention provides fast, sensitive imaging of terahertz radiation without requiring a cryogenically-cooled detector.

The vapour may be heated to temperatures above 10° C.

This may help to ensure sufficient atomic vapour pressure for effective terahertz-to-optical conversion.

The vapour may be heated to temperatures of up to about 100° C., or up to about 60° C.

Although the vapour pressure increases with increasing temperature, very high temperatures may lead to 'energy pooling' effects, deleterious to the imaging process.

The atoms may be alkali metal atoms.

In particular, the atoms may be caesium atoms.

Said vapour of atoms may comprise atoms of multiple species.

In some embodiments, said vapour of atoms comprises atoms of a first species and atoms of a second species, wherein respective frequencies of said one or more laser beams and said imaging beam are such that at least some of said atoms of said first species, when subjected to radiation of both said one or more laser beams and said imaging beam, are excited to said final excited state which decays to said lower energy state by emission of said optical fluorescence; the apparatus further comprising:

one or more second laser beams propagating through said cell, said one or more second laser beams defining a second sensing region in said cell;

a second imaging beam for illuminating the object receiving area, said second imaging beam comprising microwave or terahertz radiation;

wherein said imaging system is arranged for focusing the second imaging beam to form, in use, a second image of said object at said second sensing region in said cell;

wherein respective frequencies of said one or more second laser beams and said second imaging beam are such that at least some of said atoms of said second species of atom, when subjected to radiation of both said one or more second laser beams and said second imaging beam, are excited to a final excited state which decays to a lower energy state by emission of optical fluorescence.

Said frequency of said second imaging beam may be different from said frequency of said first imaging beam.

By imaging an object using different imaging beam frequencies, it may be possible to probe the material characteristics of the object being imaged and/or to distinguish between different materials or compounds within the object being imaged.

Said optical fluorescence emitted by said atoms of said first species and said optical fluorescence emitted by said atoms of said second species may be of different colours.

This may provide a means for distinguishing the first and second images generated using each atoms of said first and second species respectively. Images obtained using two different microwave or terahertz frequencies for the first and second imaging beams may thereby be spectrally discriminated in the visible range as each colour optical fluorescence will result from a particular frequency of imaging beam.

The imaging system may be configured for transmitting visible light.

This may enable dual optical and terahertz imaging of an object received at the object receiving area. For example, the imaging system may comprise lenses comprising polymethylpentene (TPX).

In accordance with another aspect of the invention, there is provided a method for imaging using microwave or terahertz radiation, the method comprising:

providing a cell comprising a vapour of atoms;

propagating one or more laser beams through said cell, said one or more laser beams defining a sensing region in said cell;

illuminating an object by an imaging beam, said imaging beam comprising microwave or terahertz radiation;

focusing the imaging beam, using an imaging system, to form an image of said object at said sensing region in said cell;

wherein respective frequencies of said one or more laser beams and said imaging beam are such that said atoms, when subjected to radiation of both said one or more laser beams and said imaging beam, are excited to a final excited state which decays to a lower energy state by emission of optical fluorescence.

BRIEF DESCRIPTION OF THE DRAWINGS

Preferred embodiments of the present invention will now be described, by way of example only and not in any limitative sense, with reference to the accompanying drawings, in which.

DETAILED DESCRIPTION OF EMBODIMENTS

Figure 1:
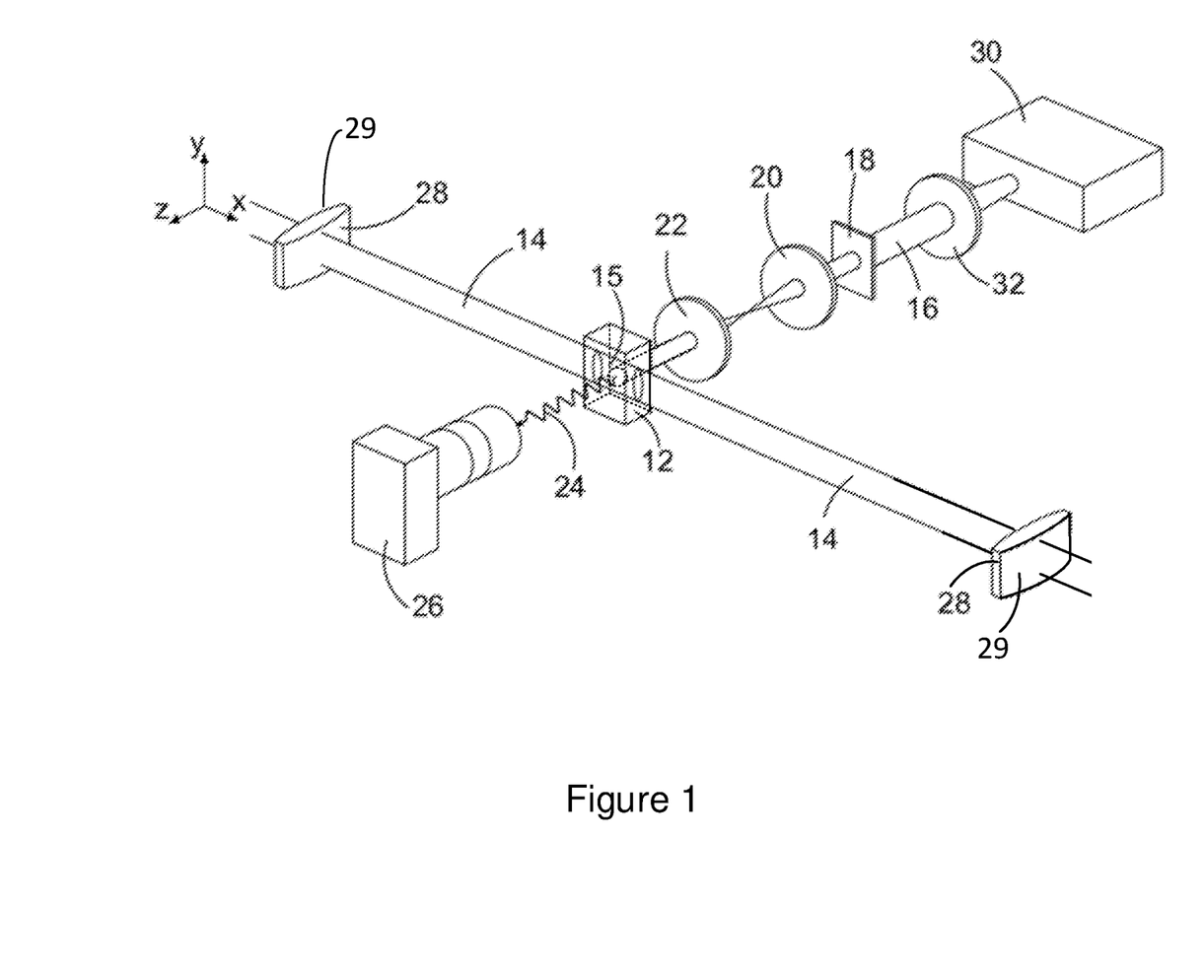
FIG. 1 illustrates an apparatus according to an embodiment of the invention.

With reference to FIG. 1, an apparatus 10 according to an embodiment of the present invention comprises a cell 12 comprising a vapour of caesium (Cs) atoms, three laser beams 14 propagating coaxially though the cell 12 and a terahertz-frequency imaging beam 16. The imaging beam 16 illuminates an object 18 positioned at an object receiving area or object plane of the apparatus 10. An imaging system 20, 22 focusses the terahertz imaging beam 16 to form an image of the object 18 in the cell 12.

The respective frequencies of the laser beams 14 and the imaging beam 16 are such that atoms in the cell 12, when subjected to radiation from both the laser beams 14 and the imaging beam 16, are excited to a final excited state which decays to a lower energy state by emission of optical fluorescence 24. The optical fluorescence 24 emitted by the atoms in the cell 12 is then imaged by a camera 26.

In the present embodiment, the cell 12 is a cuboidal quartz cell with an optical path of 1 cm, which is heated to a temperature of about 40° C. Sensitivity may be improved by operating at higher temperatures.

Figure 2:
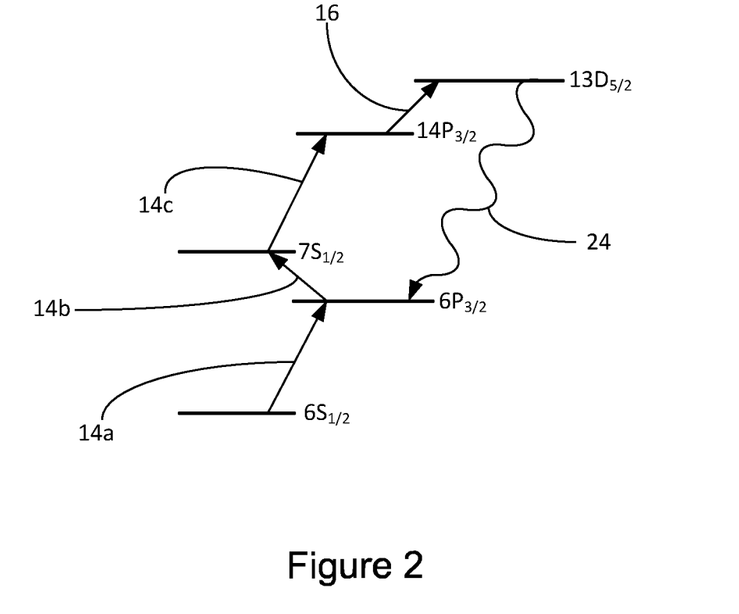
FIG. 2 illustrates caesium atomic energy levels and a laser excitation scheme, suitable for use in the present invention.

With reference to FIG. 2, the three laser beams 14 prepare the atoms in the caesium vapour in the cell 12 in an excited state, corresponding to an initial excited state ($14P_{3/2}$). These excited-state atoms can transition to a nearby atomic state, corresponding to a final excited state $13D_{5/2}$ through interaction with the terahertz radiation of the imaging beam 16. Atoms that have interacted with the terahertz radiation and are in the $13D_{5/2}$ state have a probability to decay by emitting fluorescence 24 at optical frequencies. In particular, atoms in the final excited state ($13D_{5/2}$) are more likely to decay by emitting green fluorescence than those atoms that remain in the initial excited state ($14P_{3/2}$), thereby mapping the incident terahertz radiation field 16 to green fluorescence 24 of the atoms. Accordingly, the region in which the laser beams 14 overlap inside the cell 12 can be considered to be a sensing region 15, in which the terahertz-to-optical conversion takes place. The states $14P_{3/2}$ and $13D_{5/2}$, corresponding respectively to the initial and final excited states in this embodiment, are sometimes referred to as Rydberg states.

With continued reference to FIG. 2, the three laser beams 14 excite the atoms in the caesium vapour from the ground state ($6S_{1/2}$) to the initial excited state ($14P_{3/2}$) using a three-step excitation process. That is, the respective frequencies of the three laser beams 14 correspond to three respective transitions of the three-step excitation process between the ground state ($6S_{1/2}$) and the initial excited state ($14P_{3/2}$). In this embodiment, all three lasers have frequencies in the infra-red range. A 'probe' laser beam 14a, having a wavelength of 852 nm, excites atoms from the ground state ($6S_{1/2}$) to a first intermediate state ($6P_{3/2}$). A 'coupling' laser beam 14b, having a wavelength of 1470 nm, takes atoms from the first intermediate state ($6P_{3/2}$) to a second intermediate state ($7S_{1/2}$). The frequencies of both the probe and coupling laser beams are stabilised to their respective atomic resonances, for example using polarisation spectroscopy. A 'Rydberg' laser beam 14c having a wavelength of 843 nm is tuned to the frequency of the transition between the second intermediate state ($7S_{1/2}$) and the initial excited state ($14P_{3/2}$). In this embodiment, the Rydberg laser beam 14c is derived from a free-running laser. The imaging beam 16, having a frequency of 0.55 THz, is tuned to the frequency of the transition between the initial excited state ($14P_{3/2}$) and the final excited state ($13D_{5/2}$).

All three laser beams 14 propagate coaxially through the cell 12 (parallel to the x-axis in FIG. 1). Cylindrical lenses 28 are used to shape the laser beams 14 to form a light sheet extending in the x-y plane and having a width (parallel to the z-axis) of approximately 100 μm. The light sheet has a height of approximately 10 mm at the position of the cell 12, providing a sensing region 15 having an area of about 100 mm². The probe, coupling and Rydberg laser beams 14a, 14b, 14c have powers of approximately 300 μW, 20 mW and 100 mW respectively. The skilled person will appreciate that the laser beams 14 could be shaped using an SLM (spatial light modulator) or diffractive optics instead of the cylindrical lenses 28. This may be useful in obtaining flatter images. The area of the sensing region 15 may be increased by increasing the area of the cell 12 in the x-y plane, increasing the width of the light sheet in the y-direction, and, if necessary, increasing the power in the laser beams 14. In general, increasing the power of the laser beams 14 may lead to increased imaging sensitivity.

To further enhance the laser field in the sensing region 15, an optical cavity may be provided around the cell 12. In the apparatus 10 of FIG. 1, this may be achieved, for example, by providing a high-reflectivity (HR) coating on the curved surfaces 29 of the cylindrical lenses 28 furthest from the cell 12. The optical cavity effectively causes the laser beams 14 to pass multiple times though the cell 12, enhancing the laser field strength in the sensing region 15. Since the maximum achievable size of the sensing region 15 may be limited by the available laser power, an optical cavity may be used to achieve a larger sensing region 15 for a given laser power. In addition, the effect of the optical cavity reflecting the laser beam back on itself may partially compensate absorption effects (Beer's law) of the laser beams 14, which can affect the uniformity of the brightness of the optical fluorescence from one side of the sensing region 15 to the other. Creating an optical cavity which is resonant for all of the laser beams may not be feasible, so it may be preferable to compromise one laser beam at the expense of another by providing a cavity with a relatively low finesse.

The Rydberg laser beam 14c propagates in the opposite sense to the probe and coupling laser beams 14a, 14b to minimize the 3-photon Doppler shift due to atomic motion through the optical fields. Atoms moving in opposite directions along the x-direction parallel to the laser beams 14 experience mismatched laser frequencies that inhibit laser excitation, suppressing excitation of fast-moving atoms.

The imaging beam 16 is a free-space, continuous wave (CW) terahertz beam output by a terahertz source 30. In this embodiment, the terahertz source 30 generates the terahertz beam by frequency-multiplying a microwave signal. The terahertz source 30 comprises an amplifier multiplier chain (AMC) (available from e.g. Virginia Diodes Inc.), seeded by a microwave signal generator, and launched into free space using a diagonal horn antenna, giving a maximum output power of 15 μW. The linewidth of the terahertz imaging beam 16 is less than 1 MHz. The output of the terahertz source 30 is primarily linearly polarised parallel to the vertical axis (y), and is collimated using a collimating lens 32, in the form of a 5.08 cm (2 inch) diameter, 75 mm focal length, PTFE lens. This provides uniform illumination at the location of the object 18 to be imaged. The skilled person will appreciate that a different microwave or terahertz source may be used for generating the imaging beam 16, for example a quantum cascade laser (QCL).

The imaging beam 16 propagates parallel to the z-axis and is incident normal to the plane of the light sheet at the sensing region 15.

The imaging system 20, 22 comprises two lenses arranged to form a conjugate image of the object 18 in the plane of the light sheet at the sensing region 15. The lenses 20, 22 of the imaging system are provided by two aspheric PTFE lenses, arranged to form a 1:1 transmission imaging system. In this embodiment, a numerical aperture of 0.25 was used, although the skilled person will appreciate that increasing the numerical aperture would increase the spatial resolution of the apparatus 10. An object 18 placed at the object-receiving area of the apparatus 10 is thereby imaged onto the sensing region 15 in the cell 12. The skilled person will appreciate that other materials may be used for the lenses 20, 22 of the imaging system, for example Shapal, which usefully has a refractive index n higher than 2.5 at terahertz frequencies. Alternatively, the PTFE lenses 20, 22 of the imaging system could be replaced by clear lenses (for example, lenses comprising polymethylpentene (TPX)) to allow a dual, i.e. optical and terahertz, imaging set-up, which may allow the apparatus 10 to be retrofitted to existing optical imaging systems. In other embodiments, the imaging system may include one or more mirrors, for example parabolic metal mirrors.

The camera 26 is positioned for imaging the optical fluorescence 24 normal to the plane of the light sheet in the sensing region 15, but from the opposite side of the cell 12 from that on which the imaging beam 16 is incident. The skilled person will appreciate that, in alternative embodiments, the camera 26 shown in FIG. 1 may be replaced by lenses and an image sensor as separate components.

The camera 26 may be used for obtaining single-shot images or high-speed video of the optical fluorescence from the atoms in the cell 12.

In the embodiment described above, the object 18 is imaged by transmission of the imaging beam 16. However, in alternative embodiments the object 18 may be imaged by reflection of the imaging beam 16. That is, the terahertz source 30 and collimating lens 32 may be located on the same side of the object 18 as the detection optics (imaging system lenses 20, 22, cell 12, and camera 26). This may enable the apparatus to be more compact.

Figure 3:
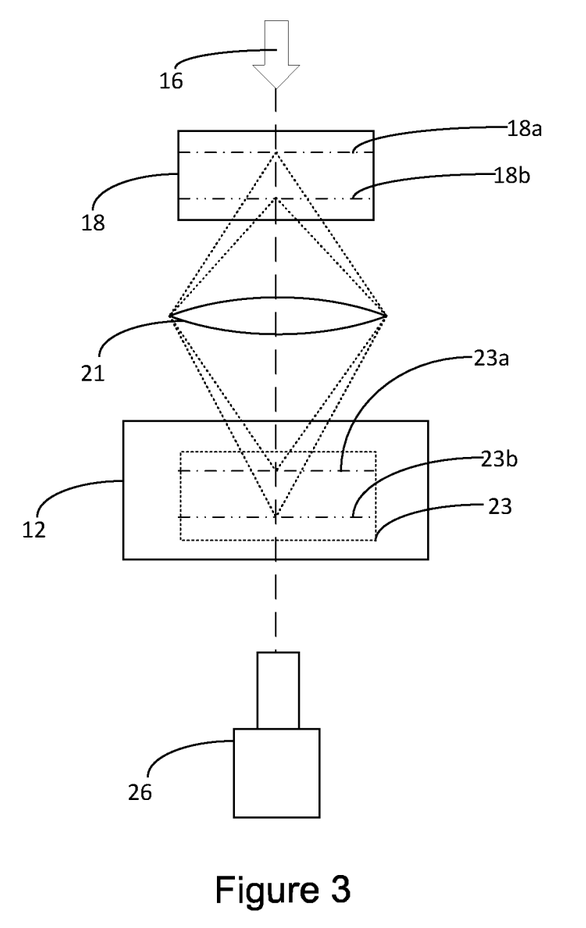
FIG. 3 schematically illustrates formation of a 3D image of a 3D object according to an embodiment of the invention.

With reference to FIG. 3, the apparatus 10 may also be used for obtaining a 3D image 23 of the object 18. In the apparatus 10 of the present disclosure, the terahertz field being imaged is not terminated by the sensor (i.e. the atoms in the sensing region). Therefore, the terahertz imaging beam 16 may be used for imaging a 3D object onto the 3D vapour in the cell 12. Formation of the 3D image 23 is schematically illustrated in FIG. 3. For simplicity, the imaging system is represented by a simple lens 21. Planes 18a and 18b of the object are imaged by the imaging system 21 to corresponding planes 23a and 23b of the 3D image 23 in the cell 12. By rastering (i.e. scanning) the 2D light sheet 15 back and forth rapidly in the cell 12, by scanning the propagation axis of the laser beams 14 back and forth along the z-axis, 2D slices of the 3D image 23 may be sensed by the sensing region (provided by the rastered light sheet 15) at multiple locations along the z-axis and captured by the camera 26. A 3D tomographic image may then be reconstructed from the 2D sectional images captured by the camera 26. Alternatively, the apparatus 10 could be modified to provide a three-dimensional sensing region, rather than the 2D sensing region provided by the light sheet 15 illustrated in FIG. 1, by increasing the width of the laser beams 14 in the cell 12 along the z-axis. Off-axis image distortion arising due to an extended object 18, is potentially correctable during processing of the camera images. The 3D image 23 may also be imaged from above, i.e. perpendicular to the axis of the imaging beam 16 shown in FIG. 3.

Figure 4:
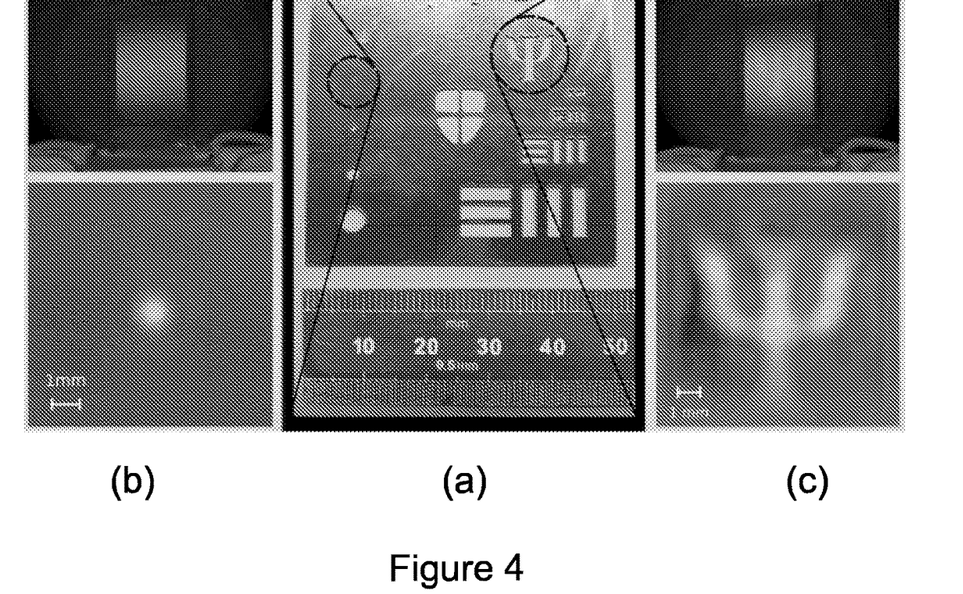
FIG. 4 shows (a) an object imaged using the apparatus of FIG. 1 and excitation scheme of FIG. 2, (b) an image obtained using the apparatus of FIG. 1, the camera being a digital camera, and (c) an image obtained using the apparatus of FIG. 1, the camera being an EMCCD (electron-multiplying charge-coupled device) camera.

With reference to FIG. 4, the spatial resolution of the apparatus 10 shown in FIG. 1 is demonstrated by imaging an object 18 in the form of a metal mask with apertures of varying sizes and shapes, including a 0.5 mm pinhole and a 'psi'-shaped aperture. FIG. 4a shows the mask next to a ruler. FIG. 4b shows (top) a true-colour unprocessed photograph of the 0.5 mm pinhole obtained using the apparatus 10 of FIG. 1, the camera 26 being a commercially-available DSLR camera, and (bottom) a false-colour processed image of the 0.5 mm pinhole obtained using the apparatus 10 of FIG. 1, the camera 26 being an EMCCD camera (an Andor iXon EMCCD camera). The true-colour photograph (top) shows a central spot of green fluorescence emitted by atoms that have interacted with the part of the imaging beam 16 transmitted by the pinhole and imaged onto the sensing region 15 of the cell 12, surrounded by background 'yellow' fluorescence emitted by atoms in the cell 12 that have not interacted with the terahertz radiation of the imaging beam 16. The false-colour image (bottom) is created by subtracting a background image of the atoms in the absence of the imaging beam 16. FIG. 4c shows corresponding (top) true-colour photograph and (bottom) false-colour processed image of the 'psi'-shaped aperture. The 1 mm thick 'psi'-shaped aperture is clearly resolved, but the sub-wavelength diameter pinhole is limited by diffraction. Interference fringes due to due to reflections of the imaging beam 16 within the cell 12 could be reduced or removed by reducing the width of the cell 12 parallel to the imaging beam (i.e. parallel to the z-axis), for example to less than half a wavelength of the radiation of the imaging beam (e.g. to around 200 microns for the 0.55 THz imaging beam 16 described above), and/or by providing an anti-reflection (AR) coating on the cell 12.

Figure 5:
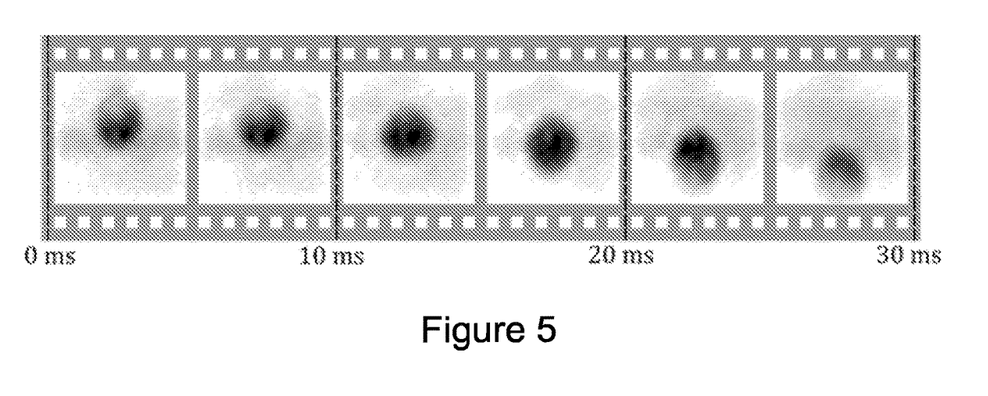
FIG. 5 shows a sequence of images of water droplets in free-fall, obtained in real time at a 200 Hz frame rate, using the apparatus of FIG. 1 and excitation scheme of FIG. 2.

With reference to FIG. 5, the temporal resolution of the apparatus 10 shown in FIG. 1 is demonstrated by recording a video in real-time of a water droplet in free-fall, shortly after being released from a pipette, using a camera 26 operating at a 200 Hz frame rate. Images from the video are shown in FIG. 5. A Photron high-speed camera was used to record this video. To improve image clarity and remove readout noise from the camera, the images are binned (by 8) and then filtered using a spatial Fourier filter to remove the grid-like readout noise added by the camera. The level of motion blur is consistent with the speed distribution of the atoms and exposure time. Ultimately, the response time of the apparatus 10 is limited by the lifetime of the atoms, on the order of microseconds.

The noise floor of the images was measured to be of the order of 10 pW and is probably limited by the level of background black body THz radiation. The noise floor can be improved by better filtering of the decay from the final excited state ($13D_{5/2}$), for example by using a narrow-band spectral filter. In other embodiments of the apparatus, there may be multiple decay pathways from the final excited state, which may include fast population transfer from the final excited state to other excited states (e.g. within a Rydberg manifold). In such cases, the optical fluorescence 24 may include many fluorescence lines, each with an associated characteristic decay time. Filtering the optical fluorescence 24 may enable selection of the fastest decay processes, improving spatial resolution at the camera 26.

Another means for reducing the noise floor is to drive an off-resonant Raman transition. For example, instead of directly exciting the initial excited state ($14P_{3/2}$), the Rydberg laser beam 14c at 843 nm may be detuned from the transition between the intermediate state ($7S_{1/2}$) and the initial excited state ($14P_{3/2}$) by a detuning ($\Delta$). When the terahertz imaging beam 16 at 0.55 THz is also detuned from the transition between the initial excited state ($14P_{3/2}$) and the final excited state ($13D_{5/2}$) by a corresponding detuning ($-\Delta$), atoms are transferred directly from the intermediate state ($7S_{1/2}$) to the final excited state ($13D_{5/2}$) by a two-photon Raman transition. This reduces the noise floor by reducing optical fluorescence due to decay from the initial excited state ($14P_{3/2}$). However, the resultant improvement in the noise floor is at the expense of reduced sensitivity due to lower transition strength. Nonetheless, the continuous tuning from the resonant absorption process to the off-resonant Raman process is an advantage because it allows one to trade off noise floor against sensitivity, depending on the required application. In addition, use of an off-resonant Raman process significantly increases the dynamic range of the apparatus 10, allowing much more intense radiation fields to be imaged.

Figure 6:
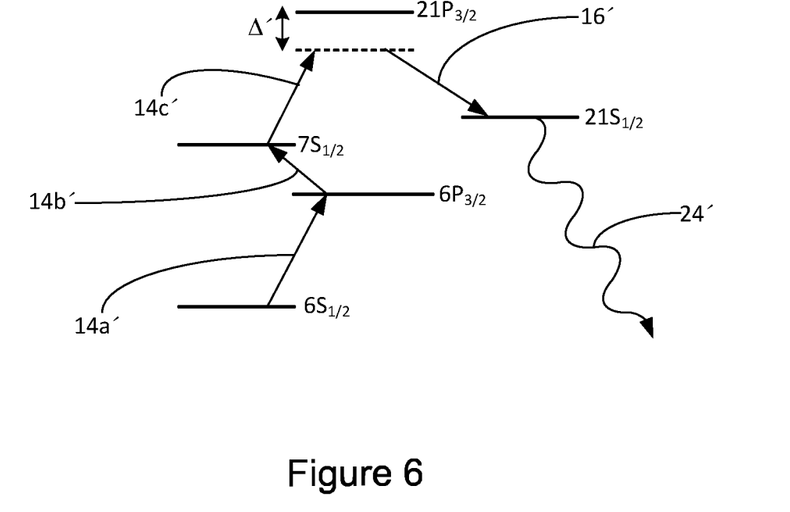
FIG. 6 illustrates caesium atomic energy levels and an alternative laser excitation scheme, suitable for use in the present invention.

With reference to FIG. 6, an alternative laser excitation scheme is shown. In this alternative scheme, the three laser beams 14' and the terahertz radiation of the imaging beam 16' collectively transfer caesium atoms in the vapour cell 12 from the ground state ($6S_{1/2}$) to an alternative final excited state ($21S_{1/2}$). Atoms in the final excited state ($21S_{1/2}$) have a probability to decay by emitting fluorescence 24' at optical frequencies, in particular in the green part of the spectrum, thereby mapping the incident terahertz radiation field 16' to green fluorescence 24' of the atoms. The probe laser beam 14a', having a wavelength of 852 nm, excites atoms from the ground state ($6S_{1/2}$) to a first intermediate state ($6P_{3/2}$, F=5). The coupling laser beam 14b', having a wavelength of 1470 nm, takes atoms from the first intermediate state ($6P_{3/2}$, F=5) to a second intermediate state ($7S_{1/2}$, F=4). The Rydberg laser beam 14c' having a wavelength of 799 nm is now detuned by a frequency detuning $\Delta'$ from the frequency of the transition between the second intermediate state ($7S_{1/2}$, F=4) and an alternative initial excited state ($21P_{3/2}$), but the hyperfine structure is not resolved. The detuning $\Delta'$ may be, for example, −243 MHz. In this embodiment, the probe and coupling laser beams 14a' and 14b' are frequency-stabilised, but the Rydberg laser beam 14c' is derived from a free-running laser. The imaging beam 16', having a frequency of 0.634 THz, is detuned by a frequency detuning $\Delta'$ (matching the detuning of the Rydberg laser beam 14c') from the frequency of the transition between the initial excited state ($21P_{3/2}$) and the final excited state ($21S_{1/2}$). The linear polarisation of the Rydberg laser beam 14c' is aligned with the linear polarisation of the terahertz imaging beam 16'.

Detuning the Rydberg laser beam 14c' prevents the creation of atoms in the first excited state by laser excitation alone. In particular, atoms in Rydberg states are only created by the Raman transition that involves both the laser beams 14' and terahertz imaging beam 16'. Thus the atoms are excited straight to the final excited state ($21S_{1/2}$) at locations where the terahertz imaging beam 16' and laser beams 14' overlap in space in the cell 12. In the laser excitation scheme shown in FIG. 6, the terahertz radiation of the imaging beam 16' is not absorbed because it drives stimulated emission.

While the laser excitation scheme of FIG. 6 has certain advantages, it has been found that the laser excitation scheme shown in FIG. 2 provides increased sensitivity. Although it requires higher laser powers to reach states with higher principal quantum number (n), this was expected to be compensated by the increase in terahertz transition strength at high n. Surprisingly, the inventors have found that operating at states having lower n (e.g. using the excitation scheme illustrated in FIG. 2) provides an increase in sensitivity by a factor of over 100 compared with operating at higher n states (e.g. FIG. 6).

Although the present invention has been described using a caesium atomic vapour, the skilled person will appreciate that other atoms may be used, in particular other alkali metal atoms. Resonant atomic transitions in potassium, rubidium and caesium span the terahertz gap, offering a wide selection of detection frequencies. The skilled person will also appreciate that a wide range of frequencies are available for the imaging beam 16, spanning the microwave and terahertz frequency ranges. Different THz frequencies can be useful for probing the material characteristics of the object being imaged, or for differentiating between different compounds within the object being imaged.

In some embodiments, two or more different atomic species may be used for imaging the same object. This could be used to distinguish between different materials in the object or objects being imaged. For example, the cell 12 may comprise a vapour comprising a mixture of two or more different species of atoms (e.g. caesium and rubidium). One or more second laser beams and a second imaging beam (comprising microwave or terahertz radiation) may be provided for interacting with atoms of the second species. The second laser beam(s) define a second sensing region, which may substantially overlap the first sensing region. When subjected to radiation of both the second laser beam(s) and the second imaging beam, the atoms of the second species are also excited to an excited state which decays to a lower energy state by emission of optical fluorescence.

By selecting excitation schemes in which the frequencies of the first and second imaging beams (interacting respectively with the first and second species of atoms) are significantly different from each other, it may be possible to obtain a clear spectroscopic distinction for distinguishing between different materials or compounds within the object being imaged. For example, two different compounds may have the same or similar optical properties at the frequency of the first imaging beam (e.g. at 550 GHz), but very different responses at the frequency of the second imaging beam (e.g. at 1500 GHz). In general, the optical fluorescence emitted by each species of atom will be at a different frequency, i.e. different colours, providing a means for distinguishing the images generated using each species of atom. Images obtained using two different microwave or terahertz frequencies for the first and second imaging beams may therefore be spectrally discriminated in the visible range as each colour output will result from a particular frequency of imaging beam. Embodiments using two or more species of atom could thereby differentiate between different compounds in the object being imaged without prior calibration, whereas a single channel system could not. The object could be imaged using multiple species of atoms either sequentially or simultaneously.

Electronic amplifier sources are relatively straightforward to use but are currently viable only up to a maximum frequency of 1.5 THz, with output power generally decreasing as the frequency increases. Quantum cascade laser (QCL) may be more less straightforward to use, but can provide high power output between 1.5 and 3 THz. An apparatus providing a two-colour output could therefore use an electronic source in the 0.5 to 1.0 THz range, and a QCL in the 1.5 to 2 THz range.

In other laser excitation schemes, only one laser beam 14 may be required (i.e. for a single-step excitation process), or a plurality of laser beams 14 (i.e. for a multi-step excitation process), depending on the atomic species used and its transitions.

It will be appreciated by persons skilled in the art that the above embodiments have been described by way of example only, and not in any limitative sense, and that various alterations and modifications are possible without departure from the scope of the invention as defined by the appended claims.

The invention claimed is:

1. An apparatus for imaging using microwave or terahertz radiation, said apparatus comprising:
   a single cell comprising a vapour of atoms;
   one or more laser sources configured to generate one or more laser beams propagating through said cell, said one or more laser beams defining a sensing region in said cell, wherein said one or more laser beams comprises a plurality of coaxial laser beams arranged as a light sheet defining said sensing region in said cell;
   one or more microwave or terahertz sources configured to generate an imaging beam for illuminating an object receiving area for receiving an object to be imaged, said imaging beam comprising microwave or terahertz radiation; and
   an imaging system for focusing the imaging beam to form, in use, an image of said object at said sensing region in said cell;
   wherein the imaging system includes one or more lenses or mirrors for focusing, in use, a portion of the microwave or terahertz radiation of the imaging beam transmitted or reflected by the object to form said image of said object at said sensing region in said cell;
   wherein respective frequencies of said one or more laser beams and said imaging beam are such that at least some of said atoms, when subjected to radiation of both said one or more laser beams and said imaging beam, are excited to a final excited state which decays to a lower energy state by emission of optical fluorescence.

2. An apparatus according to claim 1, further comprising a camera for imaging said optical fluorescence emitted by said atoms.

3. An apparatus according to claim 1, wherein said light sheet has a thickness of less than a wavelength of said microwave or terahertz radiation of said imaging beam.

4. An apparatus according to claim 1, configured for rastering said light sheet through at least a portion of said sensing region.

5. An apparatus according to claim 1, wherein said image at said sensing region in said cell is a three-dimensional image.

6. An apparatus according to claim 1, wherein said sensing region and said object receiving area are located at conjugate image planes of said imaging system.

7. An apparatus according to claim 1, wherein said image of said object is formed by a portion of said imaging beam transmitted or reflected by said object.

8. An apparatus according to claim 1, further comprising an optical cavity arranged around the cell to enhance the field strength of at least one of said one or more laser beams.

9. An apparatus according to claim 1, wherein the frequency of said imaging beam corresponds to a transition between an initial excited state of said atoms and said final excited state.

10. An apparatus according to claim 9, wherein respective frequencies of said one or more laser beams correspond to one or more respective steps of a single-step or multi-step excitation process between a ground state of said atoms and said initial excited state.

11. An apparatus according to claim 10, wherein:
a laser beam of said one or more laser beams, corresponding to a final step of said single-step or multi-step excitation process, is detuned from a transition between a ground or intermediate state of the atoms and the initial excited state by a first frequency detuning, and said imaging beam is detuned from the transition between the initial excited state and final excited state by a second frequency detuning having a magnitude substantially equal to that of the first frequency detuning.

12. An apparatus according to claim 1, wherein said one or more laser beams and said imaging beam are tuned for transferring atoms from a ground state or an intermediate state of said atoms to said final excited state via a stimulated Raman transition.

13. An apparatus according to claim 1, wherein said final excited state has a principal quantum number equal to or higher than 9.

14. An apparatus according to claim 1, wherein said final excited state has a principal quantum number equal to or lower than 40.

15. An apparatus according to claim 1, wherein said vapour of atoms comprises atoms of a first species and atoms of a second species, wherein respective frequencies of said one or more laser beams and said imaging beam are such that at least some of said atoms of said first species, when subjected to radiation of both said one or more laser beams and said imaging beam, are excited to said final excited state which decays to said lower energy state by emission of said optical fluorescence; the apparatus further comprising:
one or more second laser sources for generating one or more second laser beams propagating through said cell, said one or more second laser beams defining a second sensing region in said cell;
one or more second microwave or terahertz sources for generating a second imaging beam for illuminating the object receiving area, said second imaging beam comprising microwave or tera hertz radiation;
wherein said imaging system is arranged for focusing the second imaging beam to form, in use, a second image of said object at said second sensing region in said cell;
wherein respective frequencies of said one or more second laser beams and said second imaging beam are such that at least some of said atoms of said second species of atom, when subjected to radiation of both said one or more second laser beams and said second imaging beam, are excited to a final excited state which decays to a lower energy state by emission of optical fluorescence.

16. An apparatus according to claim 15 wherein said frequency of said second imaging beam is different from said frequency of said first imaging beam.

17. An apparatus according to claim 15, wherein said optical fluorescence emitted by said atoms of said first species and said optical fluorescence emitted by said atoms of said second species are of different colours.

18. An apparatus according to claim 1, wherein said imaging system is configured for transmitting visible light.

19. A method for imaging using microwave or terahertz radiation, said method comprising:
providing a single cell comprising a vapour of atoms;
propagating one or more laser beams through said cell, said one or more laser beams defining a sensing region in said cell, wherein said one or more laser beams comprises a plurality of coaxial laser beams arranged as a light sheet defining said sensing region in said cell;
illuminating an object by an imaging beam, said imaging beam comprising microwave or terahertz radiation;
focusing the imaging beam, using an imaging system, to form an image of said object at said sensing region in said cell;
wherein focusing the imaging system comprises using one or more lenses or mirrors to focus a portion of the microwave or terahertz radiation of the imaging beam transmitted or reflected by the object, to form said image of said object at said sensing region in said cell;
wherein respective frequencies of said one or more laser beams and said imaging beam are such that said atoms, when subjected to radiation of both said one or more laser beams and said imaging beam, are excited to a final excited state which decays to a lower energy state by emission of optical fluorescence.

* * * * *